United States Patent
Onuma et al.

(10) Patent No.: US 7,774,804 B2
(45) Date of Patent: Aug. 10, 2010

(54) OPTICAL DISC APPARATUS AND FLEXIBLE CABLE USED FOR THE SAME

(75) Inventors: Hideyuki Onuma, Tokyo (JP); Kuniyuki Kimura, Tokyo (JP); Atsushi Kajiya, Tokyo (JP); Kenya Tanimoto, Tokyo (JP)

(73) Assignees: Hitachi-LG Data Storage, Inc., Tokyo (JP); NOK Corporaiton, Tokyo (JP)

( * ) Notice: Subject to any disclaimer, the term of this patent is extended or adjusted under 35 U.S.C. 154(b) by 341 days.

(21) Appl. No.: 11/630,983

(22) PCT Filed: Jun. 22, 2005

(86) PCT No.: PCT/JP2005/011427
§ 371 (c)(1),
(2), (4) Date: May 9, 2008

(87) PCT Pub. No.: WO2006/003822

PCT Pub. Date: Jan. 12, 2006

(65) Prior Publication Data
US 2009/0044206 A1 Feb. 12, 2009

(30) Foreign Application Priority Data
Jun. 30, 2004 (JP) .............................. 2004-192877

(51) Int. Cl.
G11B 21/02 (2006.01)
(52) U.S. Cl. ..................................................... 720/653
(58) Field of Classification Search ........................ None
See application file for complete search history.

(56) References Cited

U.S. PATENT DOCUMENTS 6,151,284 A * 11/2000 Watanabe et al. ........... 720/601

(Continued)

FOREIGN PATENT DOCUMENTS

JP 59-39885 U1 3/1984

(Continued)

OTHER PUBLICATIONS

Official Action issued in Japanese Patent Application No. 2004-192877 on Dec. 8, 2009 (with English language translation).

*Primary Examiner*—Mark Blouin
(74) *Attorney, Agent, or Firm*—Antonelli, Terry, Stout & Kraus, LLP.

(57) ABSTRACT

An optical disc apparatus, comprising: a tray 20 being provided to be movable between a first position where an optical disc can be loaded therein and a second position where information is readout from said optical disc loaded; and a housing 10 supporting said tray to be slidable, and including an electronic circuit board in a part thereof, wherein the tray mounts thereon various kinds of parts including a pickup 30, a disc motor 31, and a control portion for controlling them, and is electrically connected between the electronic circuit board of the housing through a flexible cable, which is provided under condition of being bent within the housing, wherein a reinforcing sheet shaped 50 into waveform at the end portion thereof for dispersing the stresses is adhered in a part of a bent region of the flexible cable, which moves accompanying with movement of the tray when the tray moves between the first position and the second position.

13 Claims, 4 Drawing Sheets

U.S. PATENT DOCUMENTS 6,320,835 B1 * 11/2001 Kamei .................. 720/653

FOREIGN PATENT DOCUMENTS

| JP | 06-152077 | 5/1994 |
| JP | 7-36374 U1 | 7/1995 |
| JP | 08-088448 | 4/1996 |
| JP | 11-144403 | 5/1999 |
| JP | 2000-124573 | 4/2000 |

* cited by examiner

OPTICAL DISC APPARATUS AND FLEXIBLE CABLE USED FOR THE SAME

BACKGROUND OF THE INVENTION

1. Field of the Invention

The present invention relates to an optical disc apparatus, and in particular, it relates to an optical disc apparatus, storing a disc tray within a thin-type housing with using a flexible cable therein, as well as, a flexible cable to be applied within the same.

2. Prior Arts

In recent years, the optical disc apparatuses are widely used to be a recording medium of being recordable a large amount of information thereon, and for example, a CD-ROM and/or a DVD, etc., (hereinafter, being called by only an "optical disc") are widely used to be an external recording medium for a personal computer.

On the other hand, with a notebook-type or -size personal computer, into which such the optical disc apparatus is installed, accompanying with the demands for small-sizing and thin-sizing thereof, attempts are made upon the thin-sizing of the optical disc apparatus itself, and for that reason, a space becomes narrow, which is defined between a disc tray mounting an optical disc thereon and a housing supporting that disc tray to be slidingly movable.

For that reason, as is already known in the following Patent Document 1, a disc tray for mounting an optical disc thereon is provided to be slidingly movable between an eject position, for mounting the optical disc thereon, and a reproducing position, for reading out the information memorized on the disc, on the other hand. Thus, on the disc tray building up the optical disc apparatus, there are provided a turntable for rotating the optical disc mounted thereon, and an optical pickup portion for optically detecting the information recording on the disc, etc., and between that tray and the housing is/are disposed or wired a flexible cable(s) mentioned above. This flexible cable is disposed or wired under the condition of being curved or bent depending a relationship between the tray and the housing. Further, this flexible cable electrically connects between a substrate or circuit board, which is provided on the tray, and a substrate or circuit board, which is provided within the housing, and it moves the curved or bent portion thereof within an inside of the housing following the sliding movement of the disc tray, when the tray moves.

However, as was mentioned above, since the inside of the housing becomes narrow, accompanying with the thin-sizing of the optical disc apparatus, and therefore the flexible cable(s) cannot bend loosely or gently; therefore, there are cases where the curved portion of the flexible cable is in contact with an interior surface of the housing when the tray is stored into the housing, and a portion of the flexible cable losing the way of or cut off from escape is projected or pushed out from a gap defined between the tray and the housing, due to resistance upon contact with the interior surface of the housing. Further, when the tray keeps on moving into the housing, there will be caused a problem that the projected portion of the flexible cable is held between a rear-end portion of the tray and a front-end portion of the housing. In this manner, in particular, within such the thin-type optical disc apparatus, in case when the flexible cable thereof of held between them, there is a possibility that the tray cannot be stored within the housing, completely, and also that the flexible cable itself is damaged.

Then, according to the Patent Document 1 mentioned above, there is provided a disc drive apparatus, wherein reinforcement is made by pasting a thin plate of film made of a resin or the like on the flexible cable, thereby enabling smooth storage of the flexible cable when it is stored into the tray, as well as, preventing the flexible cable from projecting from the gap between the disc tray and the housing when it is stored into the housing.

Also, as other technologies related thereto, for example, in the following Patent Documents 2 through 4, there is already known that, although relating to a flexible circuit board (i.e., a flexible cable), but a reinforcing plate or film is provided for preventing a conductor patterns thereon from being broken or snapped, due to bending stress caused when inserting or removing a terminal formed at a tip thereof into/from a connector, as well as, provision of various kinds of shapes on the terminal portions thereof, such as, an opening hole or a waveform, etc., for preventing the stress applying onto a base film thereof from being concentrated in the vicinity of the rear end portion of that reinforcing plate or film.

Patent Documents 1: Japanese Patent Laying-Open No. Hei 11-144403 (1999);

Patent Documents 2: Japanese Patent Laying-Open No. Hei 6-152077 (1994);

Patent Documents 3: Japanese Patent Laying-Open No. Hei 8-88448 (1996); and

Patent Documents 4: Japanese Patent Laying-Open No. 2000-124573 (2000).

BRIEF SUMMARY OF THE INVENTION

As was mentioned previously, in particular, within the disc drive apparatus known in the Patent Documents 1 mentioned above, with reinforcement of the mechanical strength in the bent portion of the flexible cable, it is possible to prevent the flexible cable from being pushed out from the gap defined between the disc tray and the housing when it is stored into the housing. However, on the other hand thereof, according to experiments made by the present inventors and/or others, it is observed that the stress is concentrated on the end surface of that reinforcing film, when the flexible cable is bend within the housing. For that reason, a phenomenon is also observed, in particular, within the thin-type optical disc apparatus, that repetitively storing the disc tray into the housing (about 10,000 to 20,000 times) causes cracking or breaking of the flexible cable on the end surface of the reinforcing film.

Then, according to the present invention, by taking the drawbacks within the conventional arts mentioned above into the consideration, an object thereof is to provide an optical disc apparatus and a flexible cable to be used in the same, being suitable for the thin-type optical disc apparatus, wherein a thin plate or film of a resin or the like is pasted on the flexible cable, for reinforcement thereof, so as to prevent the flexible cable from being pushed outside from the gap defined between the disc tray and the housing while enabling smooth storage of the disc tray into an inside of the tray, and also the flexible cable is hardly snapped or cut down in spite of the large number of repetitions of storing the disc tray into the housing, and thereby obtaining a long lifetime thereof.

Thus, according to the present invention, for accomplishing the object mentioned above, firstly there is provided an optical disc apparatus, comprising: a tray being provided to be movable between a first position where an optical disc can be loaded therein and a second position where information is readout from said optical disc loaded; and a housing supporting said tray to be slidable, and including an electronic circuit board in a part thereof, wherein said tray mounts thereon, at least: a pickup portion for reading out information from the optical disc loaded; a disc motor for rotationally driving the optical disc; and a part including a control portion for controlling those mentioned above; and a portion of said part mounted on said tray is electrically connected between said electronic circuit board of said housing through a flexible cable, which is provided under condition of being bent within said housing, wherein a reinforcing portion is formed on at least one side surface of said flexible cable, in a part of a bent region of said flexible cable, which moves accompanying with movement of said tray when said tray moves between said first position and said second position, and an end portion of said reinforcing portion is shaped into configuration for dispersing stresses generated when said flexible cable is bent.

Also, according to the present invention, in more details thereof, within the optical disc apparatus as described in the above, preferably, said reinforcing portion is formed between, from a position where said flexible cable is bent when said tray is located at said first position, to a position where said flexible cable is bent within around an intermediate position when said trays reaches to said second position, and the end portion of said reinforcing portion, being shaped into said stresses dispersing configuration, corresponds to the position where said flexible cable is bent within about the intermediate position when said tray reaches to said second position.

In addition thereto, according to the present invention, within the optical disc apparatus as described in the above, preferably, the configuration shaped at the end portion of said reinforcing portion for dispersing the stresses is waveform. Or, preferably, the waveform configuration shaped at the end portion of said reinforcing portion is formed at height from 0.5 mm to 10 mm, and in particular, from 0.5 mm to 2 mm. Also, it is preferable that said reinforcing portion is made up with a film, and thickness of the film is set to be about from 1.5 to 0.5 times as large as that of said flexible cable. And, in particular, the optical disc apparatus, into which the present invention is applied, is preferably a thin-type optical disc apparatus, having the housing from 13 mm to 6 mm in thickness thereof.

Further, according to the present invention, there is also provided a flexible cable to be applied within the optical disc apparatus as described in the above, within a part of a bent region of said flexible cable, which moves accompanying with movement of said tray when said tray moves between said first position and said second position, a reinforcing portion is formed on at least one side surface of said flexible cable, and an end portion of said reinforcing portion is shaped into configuration for dispersing stresses generated when said flexible cable is bent.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings. However, herein, explanation will be given on a thin-type optical disc apparatus, such as, a reproducing apparatus into which a CD-ROM (hereinafter, being called by a "optical disc") is loaded, which may be applied to be a disc drive apparatus in a notebook-size personal computer, for example, as the present embodiment. However, from the following explanation, it will be apparent that the present invention is applicable, not only into the apparatus for recoding/reproducing the CD-ROM, restrictedly, but also into that for recoding/reproducing the optical disc, in general.

Figure 2:
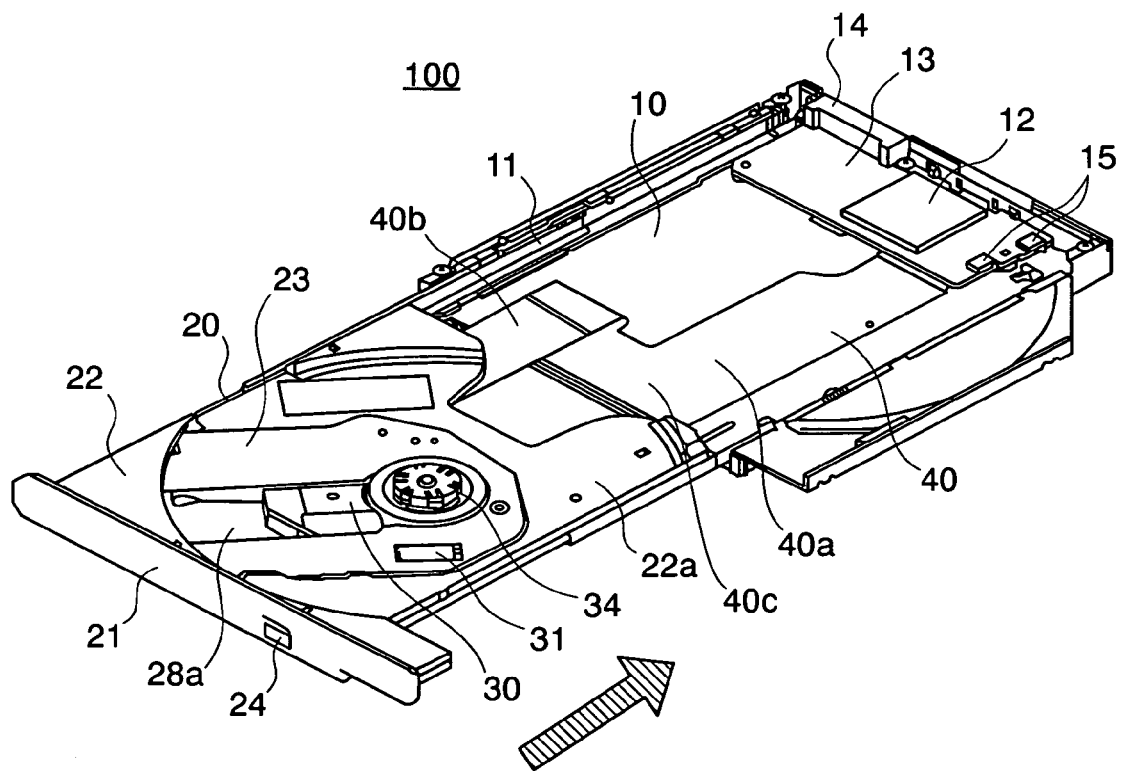
FIG. 2 is a perspective view for showing the inner structures of the optical disc apparatus, as a whole, according to the embodiment of the present invention.

Firstly, FIG. 2 attached herewith shows the inner structures of an optical disc apparatus, as a whole thereof, according to an embodiment of the present invention. Thus, in this figure, the optical disc apparatus 100 is constructed with, briefly, a housing (or a chassis) 10, and a unit including a disc tray (hereinafter, being called by only "tray") 20, on which the optical disc (not shown in the figure) is mounted. Also, on side of the housing 10 are attached a tray sliding mechanism (i.e., rails) 11 for supporting the tray 20 to be freely slidable thereon, a main substrate (or a circuit board) 13 mounting thereon electronic circuit parts 12, including a DSP (Digital Signal Processor) or the like, for example, and further an interface portion 14 between the notebook-size personal computer, etc. Also, a reference numeral 15 in the figure depicts a switch for detecting the position of the tray. However, herein a top plate covering a main body of the housing 10 mentioned above is not shown in the figure. In addition thereto, though not shown herein, on side of this housing (i.e., the chassis) 10, but it is of course for the person skilled in the art that there are further provided hooking mechanism for hooking the tray 20 when it moves to a disc eject portion (i.e., a first position), and/or a locking mechanism for locking the tray 20 when it moves to a disc reproducing position (i.e., a second position) within the housing 10, etc.

On the other hand, on the side of the unit including the tray 20 are built up with a front bezel 21, a tray frame 22, a driving unit 23, and a sub-chassis not shown in the figure, etc. The front bezel 21 is fixed at a front end of the tray frame 22, so as to slide into the direction of an arrow in the figure as an unit with the tray 20, and when the tray 20 is stored into an inside of the housing 10, it closes or seals up the housing 10 as a cover thereof. Also, on the right-hand side at a center of this front bezel 21 is provided a switch button 24 for releasing the tray from the locking condition by the locking mechanism not shown in the figure, when the tray 20 is drawn or pulled up from the inside of the housing 4. Also, as is shown in the figure, for letting the optical disc to be easily taken out there-from, a disc mounting surface 22a mounting the optical disc thereon is so formed that the optical disc mounted comes out from the disc frame 22 in a portion thereof, i.e., the width size thereof is smaller than an outer diameter of the optical disc.

Also on the side of the unit including the tray 20, as is shown in the figure, there is provided the driving unit 23, and this driving unit 23 is built up with a pickup driving portion, which is fixed at above the sub-chassis and rotationally driving a screw shaft (not shown in the figure) through a motor 31, thereby moving the pickup 30 mentioned above into a radial direction of the disc, a turntable 34 having a clamping mechanism for clamping the optical disc mounted thereon, and a turntable driving portion (not shown in the figure) for rotationally driving that turntable 34, etc.

However, the pickup 30 mentioned above comes close to the disc mounted on the turntable 34 through the function of the pickup driving portion, so as to optically read out the information, which the optical disc records thereon, for example, by means of a laser. Also, the pickup 30 is provided opposing to an opening 28a of the base extending into the radial direction of the disc, and is built up to be movable into the radial direction of the disc through driving of the pickup driving portion as the control portion thereof. Also, the turntable driving portion, including the above-mentioned turntable 34 therein, comprises a motor, but not shown in the figure, and drives the disc clamped on the turntable 34 at a constant rotation speed, when the tray 20 reaches to the predetermined disc reproducing position. And, for the purpose of connecting the substrate (or the circuit board) 13, which is provided on the housing 10, and the substrate (or the circuit board), which this tray includes, electrically, there is provided a flexible cable 40, the details of which will be explained below.

However, this FIG. 2 shows the condition where the tray 20 moves to the disc ejecting position (i.e., the first position) coming out into an outside of the housing 10, and under this condition, the optical disc can be taken out, so as to load an optical disc, newly into the optical disc apparatus, i.e., positioning the disc on the disc mounting surface 22a of that tray 20. Thereafter, the tray 20 is slid into the direction of an arrow in the figure, while being supporting by the tray sliding mechanism 11 having the guide rails, through manual operation, for example, and it reaches to so-called the disc reproducing position (i.e., the second position) for reading out the information recorded on the optical disc loaded.

On the other hand, when the switch 24 on the front bezel 21 mentioned above is pushes down, for example, excitation of solenoid sucks a plunger, which is attached on a bottom surface of the frame 22, so that a locking lever comes off from a hooking roller, i.e., into a condition of being released from the looking. Then, the tray 20 is pulled out, and it reaches to the condition is shown in FIG. 2 mentioned above.

Figure 3:
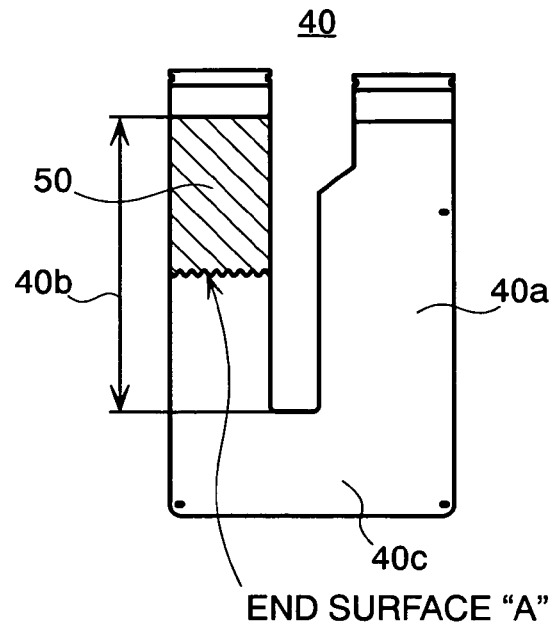
FIG. 3 is a plane view for explaining the structures of the flexible cable attached with a reinforcing film thereon, being shaped for distributing the stress applied.

Next, FIG. 3 attached herewith is a plane view of the flexible cable 40 mentioned above, which builds up the principle portion of the present invention, and as is apparent from this figure, it comprises a fixing portion 40a, which is adhered on the bottom surface of the chassis of the housing 10, a movable portion 40b, a tip portion of being connected on the side of the tray 20 and defining a bent portion, which moves depending upon the sliding movement thereof, and a portion 40c for connecting those; thereby forming an about "U"-like shape in an external configuration thereof. The flexible cable 40, in general, is made up with a film-like first insulation layer or film having insulating characteristic, forming or disposing conductor patterns thereon, and further coated with a second insulation layer or film having the insulating characteristic thereon, for protecting the conductive patterns, in the material of the structures. However, as the material of the insulating layers or films of the flexible cable 40 may be used polyimide, polyester, polyurethane, acryl, etc., but it is preferable to select the material, appropriately, by taking operating temperature, manufacturing const, etc., of the optical disc apparatus into the consideration.

Also, further, in a part of movable portion 40b of the flexible cable 40 mentioned above is adhered a reinforcing film 50, to be a reinforcing portion, on one (1) of the surfaces thereof. Hereinafter, detailed explanation of this reinforcing film 50 will be made, by referring to FIGS. 4 through 6 attached herewith.

Figure 4:
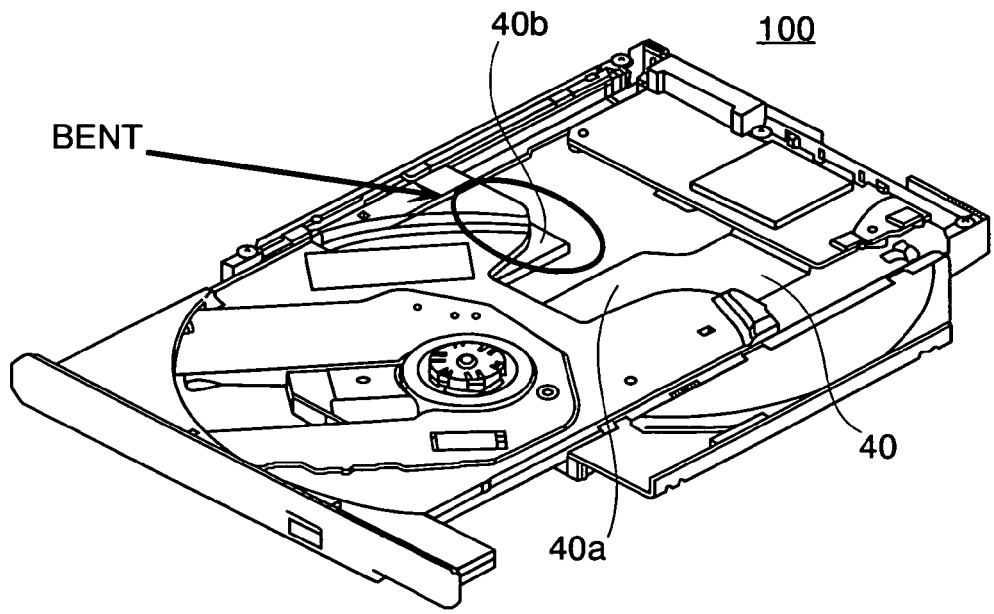
FIG. 4 is a perspective view for showing the condition on the way of storing a tray into an inside of a housing.

Firstly, FIG. 4 attached herewith shows the optical disc apparatus 100, according to the present embodiment, the detailed structures of which was explained in the above, in particular, under the condition of being able to load the optical disc into the apparatus, as was shown in FIG. 2 mentioned above, i.e., the condition on the way of moving from that condition of the disc ejecting position (the first position) where the tray 20 comes out from the housing 10 to that condition of the reproducing position (the second position) where readout is made on the information recorded in the optical disc loaded.

Figure 6A:
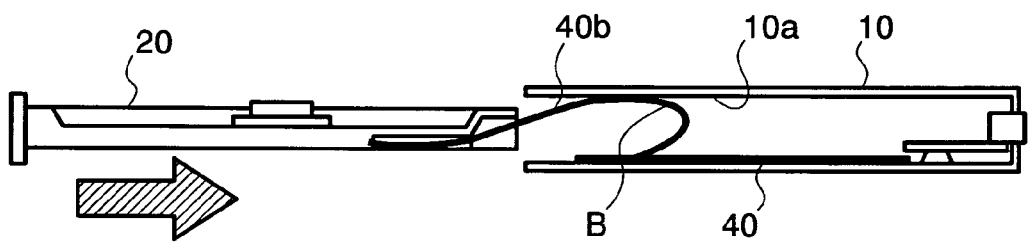
FIGS. 6(a) through 6(c) are cross-section views for showing various condition of the flexible cable, which is bent within the optical disc apparatus mentioned above.
Figure 6B:
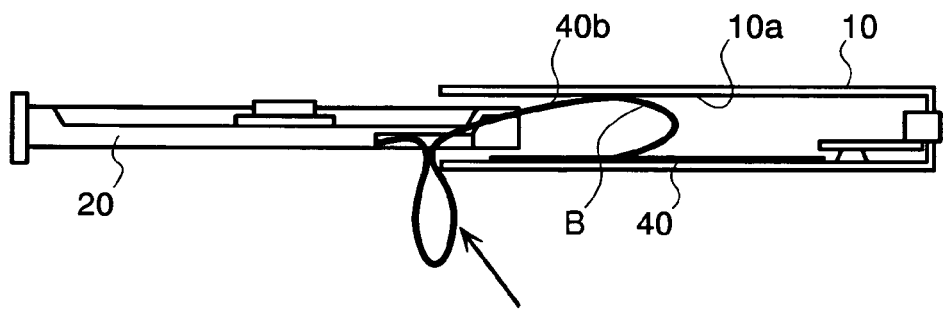
Figure 6C:
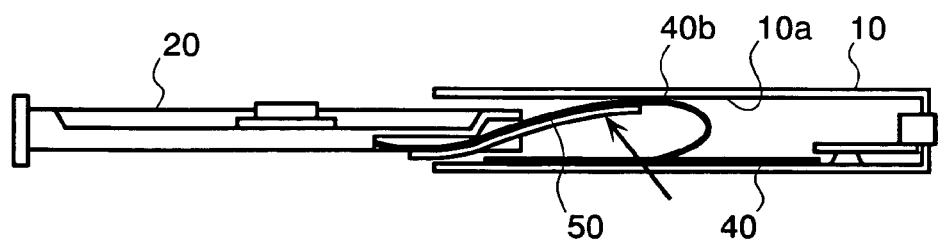

Also, FIGS. 6(a) to 6(c) attached herewith are the cross-section view for showing the condition of the flexible cable under sliding operation of the tray 20 mentioned above. Herein, FIG. 6(a) shows the condition where the tray is pulled out from the inside of the housing 10, i.e., being at the disc ejecting position (the first position). Also, FIG. 6(b) shows the condition on the way of storing the tray 20 into the housing 14. However, in those FIGS. 6(a) and 6(b) are shown the conditions where no reinforcing film 50 is adhered thereon, being as the reinforcing portion mentioned above. As is apparent from those figures, with such the flexible cable 40, as is adhered with no reinforcing film 50 thereon, the movable portion 40b of the flexible cable 40 cannot be bent loosely or gently within the housing 10 being narrow due to the thin-sizing (for example, (height) 13 mm to 6 mm) of the optical disc apparatus 100. For that reason, when the tray 20 is stored into the housing 10, a bent portion "B" on the movable portion 40b with of the flexible cable 40 comes in contact with an interior surface 10a of housing, and depending on cases, a portion of the flexible cable 40 losing the way of or cut off from escape is projected or pushed out from a gap defined between the tray 20 and the housing 10, due to resistance between the interior surface 10a of housing. Further, if the tray 20 keeps moving into the inside of the housing 10, there is caused a problem of putting the coming-out portion of the flexible cable 40 mentioned above (shown by an arrow in FIG. 6(b)) between a rear edge or end portion of the tray 20 and a front edge or end portion the housing 10. In this manner, when the flexible cable 40 is put therebetween, there is caused a problem that the tray 20 is not completely stored into the housing 10, but also that the flexible cable 40 is injured or damaged on itself.

On the contrary to this, in case when providing the reinforcing film 50 (shown by an arrow in FIG. 6(c)), being as the reinforcing portion, on the flexible cable 40, since the flexible cable 40 is increased on the rigidity or stiffness at the bent portion, then as is shown in FIG. 6(c), the portion, on which the reinforcing film 50 is adhered, is difficult to be bent or wound. As a result thereof, as is shown in FIG. 6(a) mentioned above, when the tray 20 is stored from the disc ejecting position (the first position) into the inside of the housing 10, there is no chance that the flexible cable 40 is pushed out from the gap defined between the rear end portion of the tray 20 and the front end portion of the housing 10, and thereby being put between the tray 20 and the housing 10. Thus, it is possible to hold or keep the flexible cable 40 being stored within the housing, while moving the bent portion 40b within a space inside the housing 10, with certainty, following the storage of the tray 20 into the housing 10, up to when the tray 20 reaches to the disc reproducing position (the second position).

Figure 5:
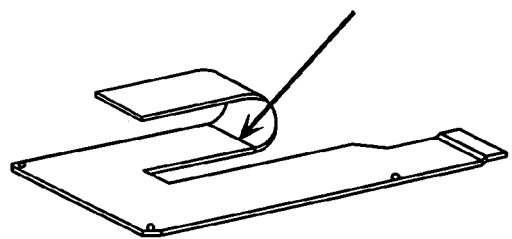
FIG. 5 is a perspective view for showing the condition of the flexible cable, which is bent within the optical disc apparatus shown in FIG. 4 mentioned above.

However, in that instance, since the degree of flexing or bending is small at the reinforcing portion 50, the flexible cable 40 does not contact with the interior surface 10*a* of the housing 10, or if it contacts with, the contacting pressure is very small. However, as is shown in FIG. 5 attached herewith, the flexible cable 40 enlarges the flexing or bending thereof at the end portion of that reinforcing portion (or film) 50 when it is bent. Thus, when being bent, stresses are concentrated at that end portion due to the function of the reinforcing portion (or film) 50. For that reason, in case when repeating the open/close operation of the tray 20 mentioned above by a large number of times, the flexible cable 40 is in the condition of being easily broken or cut off at the end portion of the reinforcing portion (or film) 50, i.e., the portion where said stresses are concentrated to.

Figure 1A:
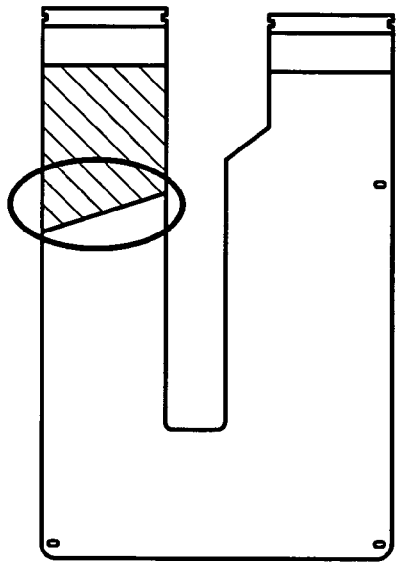
FIGS. 1(a) and 1(b) are plane views for showing the detailed example of flexible cables, each being attached with a reinforcing film thereon, which is shaped for distributing stress applied when it is bent, to be used in an optical disc apparatus, according to an embodiment of the present invention.
Figure 1B:
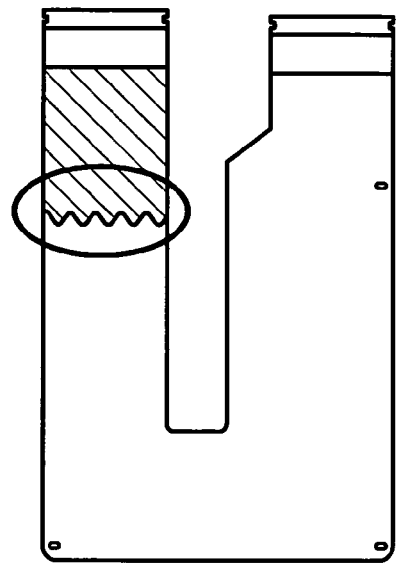

Then, further, the end portion of the reinforcing portion (or film) 50, which is formed in a part of the bent portion 40*b* of the flexible cable 40 mentioned above, is so shaped in the configuration thereof, that the stresses generated when it is bent can be dispersed. In more details thereof, as is shown in FIGS. 1(*a*) and 1(*b*), the reinforcing portion (or film) 50 is inclined obliquely at the end portion thereof (see FIG. 1(*a*)), or the end portion thereof is shaped in a manner of waves (see FIG. 1(*b*)), thereby reducing the concentration of the stresses onto the flexible cable 40 at the end of the reinforcing portion (or film) 50. However, as a material of this reinforcing portion (or film) 50 may be applied, also, polyimide, polyester, polyurethane, acryl, etc., but it is preferable to select the material, appropriately, by taking operating temperature, manufacturing const, etc., of the optical disc apparatus into the consideration. Also, in particular, the wave-like configuration formed at the end portion, as is shown in FIG. 1(*b*), should not be restricted to the waveform made of circulars, necessarily, but may be made from a triangle or rectangular, for example.

Figure 8A:
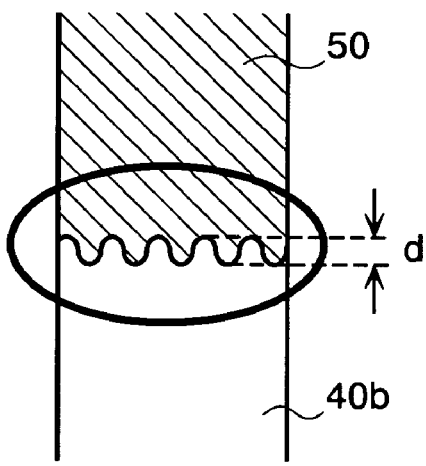
FIGS. 8(a) and 8(b) are enlarged partial plane views, each for showing more details of the reinforcing film, as shown in FIGS. 1(a) and 1(b), according to the present invention.
Figure 8B:
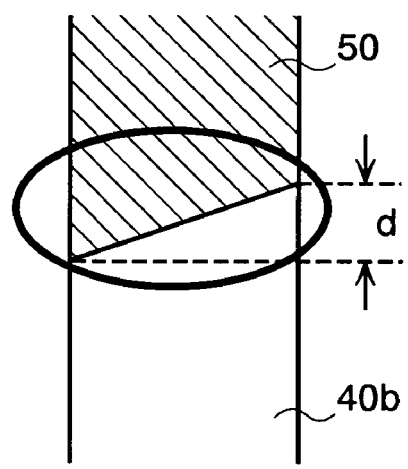

Also, not only the wave-like configuration formed at the end portion, but also the thickness of the reinforcing film 50 mentioned above, differing from the films for reinforcing the terminal portion (normally, equal or greater than 100 μm), which are known in the Patent Documents 2 through 4 mentioned above, for example, it is preferable to determined the thickness to be 1.5 times large or equal to that, or to be a half (i.e., 1.5-0.5 times), comparing to the thickness of the flexible cable 40 (normally, around 20-30 μm). Further, it is preferable that the wave-like configured end portion of the reinforcing film 50 is set up at the location corresponding to the position where the flexible cable 40 is bent, during the time when the tray 20 lies within an intermediate position, starting from the first position and reaching to the second position. Moreover, preferably, the wave-like configuration at the end portion of the reinforcing film 50 is so formed to cover the entire of width direction of the flexible cable 40, at height (d) of about 0.5 mm to 10 mm, and in particular, at height (d) of about 0.5 mm to 2 mm, as is shown in FIG. 8(*a*) attached herewith. Also, in the case where the reinforcing film 50 is inclined at the end surface thereof, it is preferable that the film is so formed to cover the entire of width direction of the flexible cable 40, at height (d) of about 0.5 mm to 15 mm, as is shown in FIG. 8(*b*) attached herewith.

Figure 7:
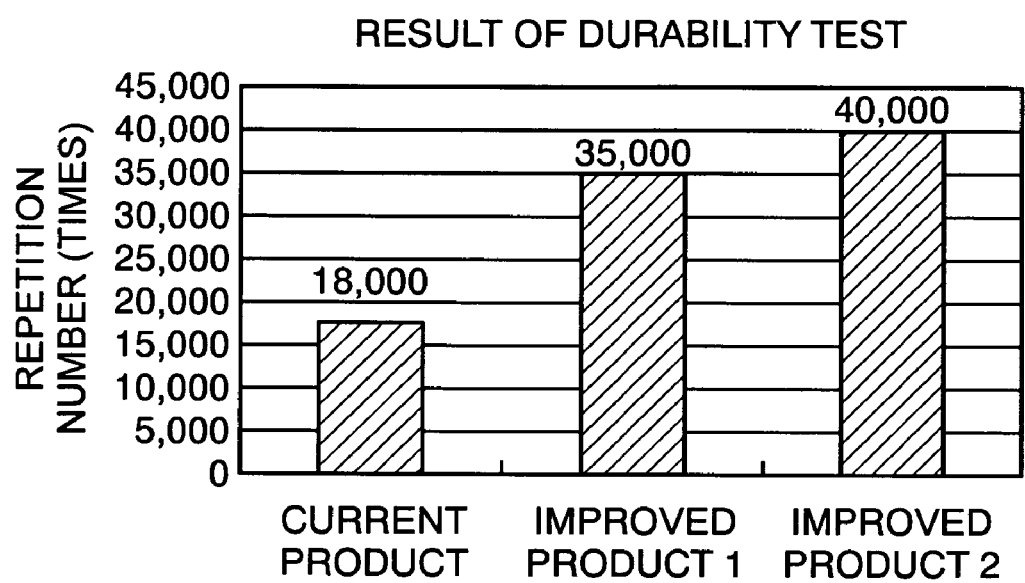
FIG. 7 is a view for showing a result of durability test obtained from the flexible cables attached with the reinforcing film thereon, as shown in FIGS. 1(a) and 1(b), according to the present invention.

FIG. 7 attached herewith shows a result of durability test conducted upon the flexible cables 40, which are adhered with the reinforcing film 50 shown in FIGS. 1(*a*) and 1(*b*) mentioned above. Herein, "current product" means a film, on which the end portion of the reinforcing film 50 is cut to be a line perpendicular to the extending direction of the flexible cable 40. On the contrary to that "improved product 1" means the case of using the flexible cable 40 adhered with the reinforcing film 50 shown in FIG. 1(*a*) thereon, and "improved product 2" the case of using the flexible cable 40 adhered with the reinforcing film 50 shown in FIG. 1(*b*) thereon, respectively.

As is apparent from this FIG. 7, with the "current product", the flexible cable 40 is in the condition of being broken or cut off at the end portion of the reinforcing film 50, i.e., the concentration portion of the stresses, due to repetition of the open/close operation of the tray by about 18,000 times. On the contrary to this, with the "improved product 1" or "improved product 2", breakage or cut-off is generated on the flexible cable 40, at last after exceeding about 35,000 times, and in particular, with the "improved product 2", the breakage or cut-off is generated on the flexible cable 40, at last after exceeding about 40,000 times.

Although the explanation was given on the case of applying the film to be the reinforcing portion 50 of the flexible cable 40, in the embodiment mentioned above, however in the place thereof, it is also possible to form it on one side surface of the flexible cable 40, by printing of a paint or coating through the silk-screen printing, for example. Also, the reinforcing portion 50 may be formed, not only on one side of the flexible cable, but on both sides thereof.

Thus, with the optical disc apparatus according to the present invention, since at the reinforcing portion of the flexible cable equipped within the optical disc apparatus is formed the reinforcing film, which is formed into the shape for dispersing the stresses generated when the flexible cable is bent, thereby to increase the rigidity or stiffness thereof, then there is no change that the flexible cable comes out from the gap defined between the tray and the housing, because of the resistance on friction due to the contact between the interior surface of the housing and the flexible cable when the tray is stored into the housing, so that the flexible cable is broken or damaged to be put between the tray and the housing, and further that the flexible cable comes into the condition of being broken or cut off through concentration of the stresses by said reinforcing portion. For that reason, it is possible to obtain an improvement on the lifetime of the optical disc apparatus, in which the insertion/discharge of the tray is repeated.

In the explanation given in the above, although explanation was given on the case that the optical disc is the CR-ROM and that the optical disc drive apparatus for use in the notebook-size personal computer, which optically reads out the information on the disc, as one example; however, the present invention is also applicable, not only such the CD-ROM drive apparatus, limitedly, but also into other disc drive apparatuses, for example, the apparatuses for recording/reproducing CD, DVD, and further, a magnetic disc, an optical disc, a magnet-optical disc, etc. Also, in the example mentioned above, explanation was made that the tray 20 is moved through manual operation, but not restricted only to this, the present invention is also applicable into the optical disc apparatus having such the structures of sliding the tray 20 by means of a driving means, such as a motor, etc.

Thus, as is apparent from the above, with the optical disc apparatus according to the present invention, since at the reinforcing portion of the flexible cable equipped within the optical disc apparatus is formed the reinforcing film, which is formed into the shape for dispersing the stresses generated when the flexible cable is bent, thereby to increase the rigidity or stiffness thereof, then there is no change that the flexible cable comes out from the gap defined between the tray and the housing, because of the resistance on friction due to the contact between the interior surface of the housing and the flexible cable when the tray is stored into the housing, so that the flexible cable is broken or damaged to be put between the tray and the housing, and further that the flexible cable comes into the condition of being broken or cut off through concentration of the stresses by said reinforcing portion, and therefore, it is possible to obtain an improvement on the lifetime of the optical disc apparatus, in which the insertion/discharge of the tray is repeated.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

100—optical disc apparatus
10—housing (chassis)
11—tray sliding mechanism (rail)
13—main substrate
20—disc tray
30—pickup
31—motor
34—turntable
40—flexible cable
40a—fixing portion of flexible cable
40b—movable portion of flexible cable
40c—connecting portion of flexible cable
50—reinforcing portion (film)
4—servo signal processor portion

What is claimed is:

1. An optical disc apparatus, comprising:
a tray being provided to be movable between a first position where an optical disc can be loaded therein and a second position where information is read out from said optical disc loaded; and
a housing supporting said tray to be slidable, and including an electronic circuit board in a part thereof, wherein said tray mounts thereon, at least:
a pickup portion for reading out information from the optical disc loaded;
a disc motor for rotationally driving the optical disc; and
a part including a control portion for controlling those mentioned above; and
wherein a portion of said part mounted on said tray is electrically connected between said electronic circuit board of said housing through a flexible cable which is provided under condition of being bent within said housing;
wherein a reinforcing portion is formed on at least one side surface of said flexible cable, in a part of a bent region of said flexible cable, which moves accompanying with movement of said tray when said tray moves between said first position and said second position, and an end portion of said reinforcing portion is shaped into a configuration for dispersing stresses generated when said flexible cable is bent; and
wherein said reinforcing portion is a film with a thickness of about 0.5 to 1.5 times as large as a thickness of said flexible cable.

2. The optical disc apparatus, as described in the claim 1, wherein said reinforcing portion is formed between, from a position where said flexible cable is bent when said tray is located at said first position, to a position where said flexible cable is bent within around an intermediate position when said trays reaches to said second position, and the end portion of said reinforcing portion, being shaped into said stresses dispersing configuration, corresponds to the position where said flexible cable is bent within about the intermediate position when said tray reaches to said second position.

3. A flexible cable to be applied within the optical disc apparatus as described in the claim 2, within a part of a bent region of said flexible cable, which moves accompanying with movement of said tray when said tray moves between said first position and said second position, a reinforcing portion is formed on at least one side surface of said flexible cable, and an end portion of said reinforcing portion is shaped into configuration for dispersing stresses generated when said flexible cable is bent.

4. The optical disc apparatus, as described in the claim 1, wherein the configuration shaped at the end portion of said reinforcing portion for dispersing the stresses is waveform.

5. The optical disc apparatus, as described in the claim 3, wherein the waveform configuration shaped at the end portion of said reinforcing portion is formed at height from 0.5 mm to 10 mm.

6. A flexible cable to be applied within the optical disc apparatus as described in the claim 5, within a part of a bent region of said flexible cable, which moves accompanying with movement of said tray when said tray moves between said first position and said second position, a reinforcing portion is formed on at least one side surface of said flexible cable, and an end portion of said reinforcing portion is shaped into configuration for dispersing stresses generated when said flexible cable is bent.

7. A flexible cable to be applied within the optical disc apparatus as described in the claim 4, within a part of a bent region of said flexible cable, which moves accompanying with movement of said tray when said tray moves between said first position and said second position, a reinforcing portion is formed on at least one side surface of said flexible cable, and an end portion of said reinforcing portion is shaped into configuration for dispersing stresses generated when said flexible cable is bent.

8. The optical disc apparatus, as described in the claim 4, wherein the waveform configuration shaped at the end portion of said reinforcing portion is formed to cover an entire width direction of the flexible cable.

9. The optical disc apparatus, as described in the claim 1, wherein said housing is about from 13 mm to 6 mm in thickness thereof.

10. A flexible cable to be applied within the optical disc apparatus as described in the claim 9, within a part of a bent region of said flexible cable, which moves accompanying with movement of said tray when said tray moves between said first position and said second position, a reinforcing portion is formed on at least one side surface of said flexible cable, and an end portion of said reinforcing portion is shaped into configuration for dispersing stresses generated when said flexible cable is bent.

11. A flexible cable to be applied within the optical disc apparatus as described in the claim 1, within a part of a bent region of said flexible cable, which moves accompanying with movement of said tray when said tray moves between said first position and said second position, a reinforcing portion is formed on at least one side surface of said flexible cable, and an end portion of said reinforcing portion is shaped into configuration for dispersing stresses generated when said flexible cable is bent.

12. A flexible cable to be applied within the optical disc apparatus as described in the claim 1, within a part of a bent region of said flexible cable, which moves accompanying with movement of said tray when said tray moves between said first position and said second position, a reinforcing portion is formed on at least one side surface of said flexible cable, and an end portion of said reinforcing portion is shaped into configuration for dispersing stresses generated when said flexible cable is bent.

13. The optical disc apparatus, as described in the claim 1, wherein the flexible cable has a thickness of above 20-30 μm.

* * * * *